Patented Mar. 28, 1950

2,501,655

UNITED STATES PATENT OFFICE 2,501,655

FROZEN LOBSTER METHOD

William M. Altenburg, Portland, Maine, assignor to GI's Incorporated of Portland, Maine, Portland, Maine, a corporation of Maine No Drawing. Application August 7, 1947, Serial No. 767,361

3 Claims. (Cl. 99—195)

This invention relates to a method of preparing lobsters for cold storage and for storing the same and to the novel treated product thereby produced.

It is a familiar fact that lobster meat has its optimum flavor and tenderness when cooked and eaten immediately after it has been removed from the ocean. Preservation of the lobster alive after removal from the ocean is difficult and costly, particularly during shipment which requires complicated and heavy shipping containers, careful handling, and also fast, expensive transit because the time interval during which the lobsters can be kept alive in shipping containers is only a few days at the most. Air shipment is even more expensive. Furthermore, even though this expensive treatment keeps the lobster alive during storage and shipment, the qualities of tenderness and taste disappear rapidly when the lobster is denied its normal diet of sea water and sea foods.

Nevertheless, despite the disadvantages of live storage and extensive efforts to overcome them, live storage has up to now been the most satisfactory for preserving this optimum flavor and tenderness of lobster. Once the lobster meat is cooked, it rapidly toughens, loses taste and discolors in storage, whether stored by canning, quick freezing or otherwise or in or out of the shell. Attempts have been made to preserve the lobster by quick freezing it live or raw in the shell but this method has been unsatisfactory for the peculiar reason that the freezing causes the meat to adhere to the shell unnaturally and so tenaciously that, even after the lobster is cooked, it is almost impossible to get the meat out of the shell.

By this invention I am enabled to overcome these difficulties and to prepare lobsters for cold storage by a novel method which causes the meat to retain the taste, tenderness and color of fresh lobster during very long periods of cold storage without adhering to the shell.

In the practice of the invention, live lobster, or fresh raw lobster in the shell, is heated for a brief period just sufficient to product a cooking, which is in effect a searing, of only the shell and the surface or skin of the meat next to the shell, and the so treated lobster is then quick frozen. I have found that the physical or chemical change in the surface of the meat produced by this preheating effects a separation of the meat from the shell of the lobster such that the meat is not objectionably adhered to the shell by the quick freezing or subsequent cold storage but remains loose therein and readily slips whole from the shell when the lobster is subsequently cooked. I have further found that the meat of the so altered and conditioned, frozen lobster will retain unchanged all its initial, fresh properties after long periods of cold storage so that when subsequently cooked it has the taste, tenderness and color of fresh lobster. This keeping quality I attribute in part to the searing action of the pre-heating on the surface of the meat which I believe has the desirable effect of sealing the natural juices in the meat.

The preferred heat treatment is an immersion of the lobster in boiling water for an interval of not less than fifteen seconds nor more than five minutes, depending on the shell thickness, the heating period being just sufficient for the heat to penetrate the shell and to produce a searing or cooking of the surface of the meat next to the shell but insufficient to cook, even partially, the meat below the surface, which remains raw. For a one pound lobster, the average optimum heating period in boiling water at atmospheric pressure has been determined to be about one and a half minutes. The optimum time is generally less for a smaller lobster and greater for a larger lobster because of lesser and greater average shell thickness, respectively. If the lobster has just grown a new shell, the optimum time of heating is generally less than the average and if the shell has grown abnormally thick and hard, the optimum time of heating may be longer than the average. Other types of heating may be employed, for example, steam heating, the time of heating being shortened or lengthened according as the heating temperature is above or below about 212° F. Web heat is preferable to dry heat as the latter tends to dry out the shell undesirably, although dry heat may be used, for example, a radar oven.

After heating, the lobster is cooled and subjected to quick freezing, for example, at a temperature of about —15° to —25° F. Preferably, the cooling and freezing take place promptly after completion of the pre-heating step. The lobster should be placed in a substantially moisture-proof container such as a carton or wrapper either before or after freezing to protect it against dehydration and freezer burn and the lobster thus prepared and frozen can be kept almost indefinitely in cold storage, for example at about 5° F. When subsequently cooked by any of the conventional methods, the meat has the taste, tenderness and color of lobster cooked live and is unadhered to and slips freely from the shell.

The invention is considered particularly significant as applied to lobsters of the crawfish variety such as are caught off the coast of Maine and other New England shores. The lobster is preferably prepared whole, but separated parts thereof, such as the claws or tail, if fresh and in the shell, may be prepared in the same manner and with the same results, and by the terms "lobster" as used in the appended claims I mean to include such separated parts.

I claim:

1. The method of preparing fresh raw lobster in the shell for cold storage which comprises heating the exterior of the lobster just sufficiently to sear the surface of the meat next to the shell without cooking the interior meat, thereby loosening the meat from the shell, then cooling and rapidly freezing the lobster.

2. The method of preparing fresh raw lobster in the shell for cold storage which comprises heating the exterior of the lobster in the presence of moisture just sufficiently to sear the surface of the meat next to the shell without cooking the interior meat, thereby loosening the meat from the shell, then cooling and rapidly freezing the lobster.

3. The method of preparing fresh raw lobster in the shell for cold storage which comprises immersing the lobster in boiling water at about 212° F. for a period of from 15 seconds to 5 minutes, thereby searing the surface of the meat next to the shell without cooking the interior meat and thereby loosening the meat from the shell, then cooling and rapidly freezing the lobster.

WILLIAM M. ALTENBURG.

REFERENCES CITED

The following references are of record in the file of this patent:

UNITED STATES PATENTS

| Number | Name | Date |
|---|---|---|
| 969,238 | Wright | Sept. 6, 1910 |
| 1,016,627 | Higgins | Feb. 6, 1912 |
| 2,151,967 | Hedreen et al. | Nov. 28, 1939 |
| 2,403,871 | McBean | July 9, 1946 |

FOREIGN PATENTS

| Number | Country | Date |
|---|---|---|
| 10,682/27 | Australia | Nov. 14, 1928 |

OTHER REFERENCES

"The Freezing Preservation of Foods," 1943, by Tressler et al., published by The Avi Publishing Co., Inc., New York publishers, pages 486 and 501.

"The Freezing Preservation of Foods," 1947, by D. K. Tressler, published by The Avi Publishing Co., Inc., page 606.